US012117328B2

(12) United States Patent
Shao et al.

(10) Patent No.: US 12,117,328 B2
(45) Date of Patent: Oct. 15, 2024

(54) METHOD AND SYSTEM OF RISK PREVENTION BASED ON ENERGY OF NATURAL GAS IN A FULL CYCLE

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 356 days.

(21) Appl. No.: 17/649,336

(22) Filed: Jan. 28, 2022

(65) Prior Publication Data

US 2022/0214203 A1   Jul. 7, 2022

(30) Foreign Application Priority Data

Feb. 4, 2021   (CN) .......................... 202110155168.X
Jan. 14, 2022   (CN) .......................... 202210045108.7

(51) Int. Cl.
   *G01F 23/16*   (2006.01)
   *G01F 25/10*   (2022.01)
   *G01N 27/416*   (2006.01)

(52) U.S. Cl.
   CPC .............. *G01F 23/16* (2013.01); *G01F 25/15* (2022.01); *G01N 27/4163* (2013.01)

(58) Field of Classification Search
   CPC .......... G01F 23/16; G01F 25/00; G01F 25/15; G01F 15/00; G01F 15/06; G01F 15/061;
   (Continued)

(56) References Cited

U.S. PATENT DOCUMENTS 5,866,803 A * 2/1999 Namba ............... G01M 3/2807
                                                              73/40
2003/0216883 A1   11/2003 Lee
(Continued)

FOREIGN PATENT DOCUMENTS

CN      101016975 A    8/2007
CN      105546352 A    5/2016
(Continued)

OTHER PUBLICATIONS

Wang, Quanguo et al., The Application Analysis of Technological Precautions on Natural Gas Pipeline, Industrial Safety and Environmental Protection, 38(12): 40-42, 2012.
(Continued)

*Primary Examiner* — Son T Le
*Assistant Examiner* — Matthew W. Baca
(74) *Attorney, Agent, or Firm* — METIS IP LLC

(57) ABSTRACT

The present disclosure discloses a risk prevention method based on energy of natural gas in a full cycle, including: obtaining loss data of natural gas based on metering equipment, wherein the loss data of the natural gas includes metering data of the natural gas consumed in a measured area during a plurality of time periods; obtaining output data of natural gas, wherein the output data of the natural gas includes metering data of the natural gas transmitted by a gas supplier in the measured area during the plurality of time periods; based on the processing of loss data of natural gas and output data of natural gas, determining whether natural gas transmission is abnormal.

13 Claims, 10 Drawing Sheets

(58) Field of Classification Search
CPC . G01F 15/063; G01F 15/075; G01N 27/4163; G01N 33/22; G01N 33/225; F17D 5/00; F17D 5/005; F17D 5/02; F17D 5/06; F17D 3/18; F17D 1/02; G08B 21/12; G08B 21/16; G01L 19/0672; G01M 3/00; G01M 3/16; G01M 3/26; G01M 3/2807; G01M 3/28; H04L 43/0817
See application file for complete search history.

(56) References Cited

U.S. PATENT DOCUMENTS

| | | | |
|---|---|---|---|
| 2006/0059977 A1* | 3/2006 | Kates | G01M 3/2807 73/40 |
| 2017/0016797 A1 | 1/2017 | Park et al. | |
| 2018/0320826 A1 | 11/2018 | Ethridge et al. | |
| 2019/0219556 A1* | 7/2019 | Buker | G01F 23/284 |
| 2020/0232194 A1* | 7/2020 | Periaswamy | G01F 1/32 |

FOREIGN PATENT DOCUMENTS

| | | |
|---|---|---|
| CN | 106996809 A | 8/2017 |
| CN | 107846446 A | 3/2018 |
| CN | 109296945 A | 2/2019 |
| CN | 109442213 A | 3/2019 |
| CN | 110296326 A | 10/2019 |
| CN | 209928242 U | 1/2020 |
| CN | 111174104 A | 5/2020 |
| CN | 111220335 A | 6/2020 |
| CN | 112178228 A | 1/2021 |
| CN | 112944221 A | 6/2021 |
| CN | 113887910 A | 1/2022 |
| JP | 2002333381 A | 11/2002 |
| WO | 2019200662 A1 | 10/2019 |

OTHER PUBLICATIONS

First Office Action in Chinese Application No. 202110155168.X mailed on Nov. 16, 2021, 14 pages.

* cited by examiner

METHOD AND SYSTEM OF RISK PREVENTION BASED ON ENERGY OF NATURAL GAS IN A FULL CYCLE

CROSS REFERENCE

This disclosure claims priority to Chinese Patent Application NO. 202110155168.X filed on Feb. 4, 2021, Chinese Patent Application NO. 202210045108.7 filed on Jan. 14, 2022, the entire contents of each of which are hereby incorporated by reference.

TECHNICAL FIELD

The disclosure relates to the field of the Internet of Things, and more particularly to method and system of risk prevention based on energy of natural gas in a full cycle.

BACKGROUND

Compared with traditional energy, the demand for natural gas in the field of urban gas and transmission will maintain a high-speed growth trend. With the increasingly complex customer groups faced by gas companies and more diversified gas application scenarios, higher requirements are put forward for the accuracy and stability of gas measurement.

Therefore, it is desirable to provide methods and systems of risk prevention based on the energy of natural gas in a full cycle to achieve accurate and stable metering of natural gas.

SUMMARY

One aspect of the present disclosure provides a risk prevention method based on energy of natural gas in a full cycle. The risk prevention method based on energy of natural gas in a full cycle, including: obtaining loss data of the natural gas based on metering equipment; wherein the loss data of the natural gas includes metering data of the natural gas consumed in a measured area during a plurality of time periods; obtaining output data of the natural gas; wherein the output data of natural gas includes metering data of the natural gas transmitted by a gas supplier in the measured area during the plurality of time periods; determining whether natural gas transmission abnormality occurs by processing the loss data of the natural gas and the output data of the natural gas.

One aspect of the present disclosure provides a risk prevention system based on energy of natural gas in a full cycle.

In some embodiments, A risk prevention system based on energy of natural gas in a full cycle, comprising: a loss data acquisition module, the loss data acquisition module is configured to obtain loss data of natural gas; wherein the loss data of the natural gas includes metering data of the natural gas consumed in a measured area during a plurality of time periods an output data acquisition module, the output data acquisition module is configured to obtain output data of natural gas; wherein the output data of natural gas includes metering equipment data of the natural gas transmitted by a gas supplier in the measured area during the plurality of time periods; a data processing module, the data processing module is configured to determine whether natural gas transmission abnormality occurs by processing the loss data of the natural gas and the output data of the natural gas.

One aspect of present disclosure provides a risk prevention device based on the energy of natural gas in a full cycle, including a processor, the processor for performing risk prevention methods based on the energy of natural gas in a full cycle.

One aspect of the present disclosure provides a computer read able storage medium. The storage medium stores computer instructions. When the computer reads the computer instructions in the storage medium, the computer performs a risk prevention method based on energy of natural gas in a full cycle.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein.

DETAILED DESCRIPTION

Figure 1:
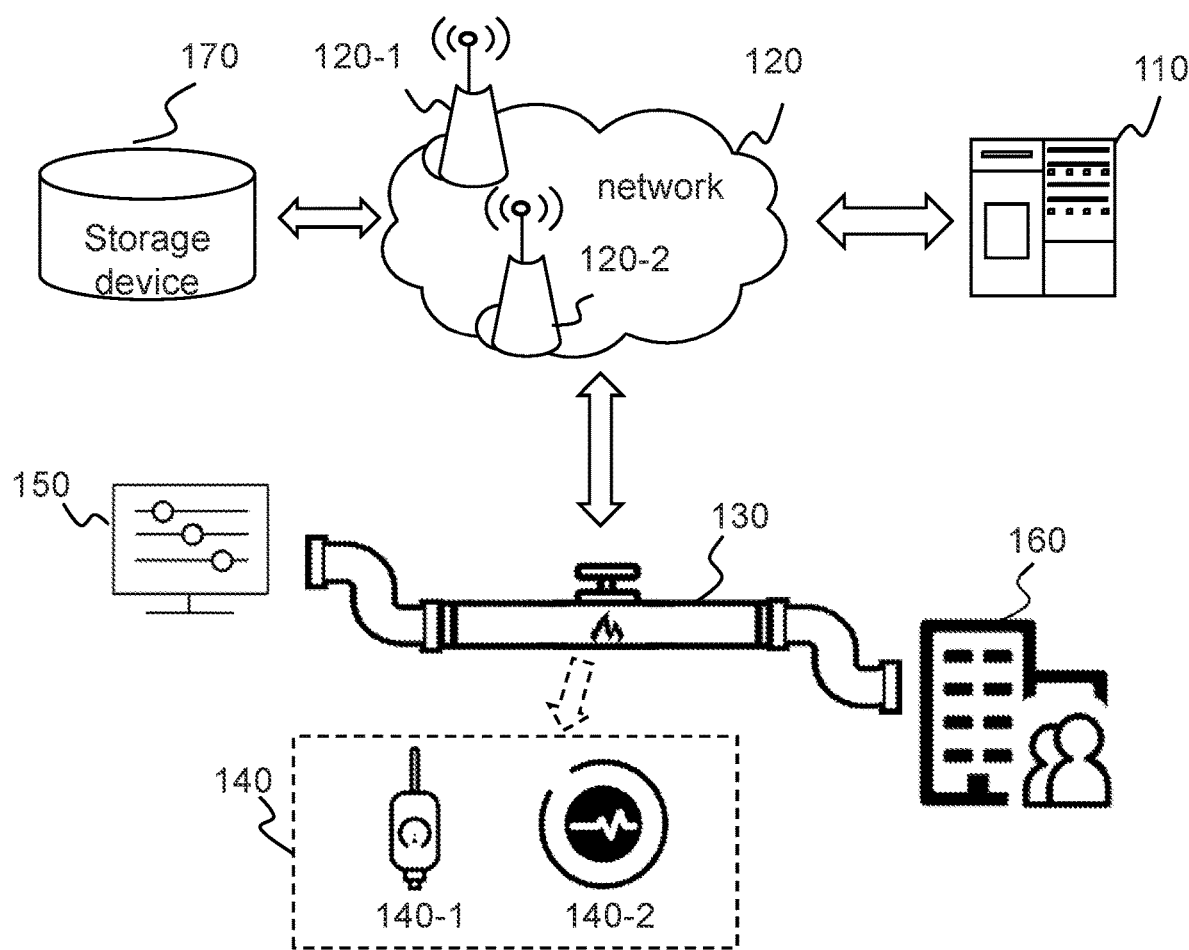
FIG. 1 is a schematic diagram of the application scenario of the risk prevention system based on the full cycle energy of natural gas according to some embodiments of present disclosure.

The technical solutions of the present disclosure embodiments will be more clearly described below, and the accompanying drawings need to be configured in the description of the embodiments will be briefly described below. Obviously, the drawings in the following description are merely some examples or embodiments of the present disclosure, and will be applied to these accompanying drawings without having to pay creative labor. Other similar scenarios. Unless obviously obtained from the context or the context illustrates otherwise, the same numeral in the drawings refers to the same structure or operation.

It should be It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram of an application scenario 100 of a risk prevention system based on the energy of natural gas in a full cycle according to some embodiments of present disclosure.

In some embodiments, the risk prevention system based on energy of natural gas in a full cycle may determine whether natural gas transmission abnormality occurs by implementing the methods and/or processes disclosed in present disclosure.

As shown in FIG. 1, the application scenario 100 according to the embodiments of present disclosure may include processing device 110, network 120, transmission pipe network 130, metering equipment 140, transmission station 150, consumption area, and storage device 170.

Processing device 110 may be configured to process data and/or information from at least one component or external data source (e.g., cloud data center) of the application scenario 100. Processing device 110 may access data and/or information from the transmission pipe network 130, the metering equipment 140, the transmission station 150, the consumption area, and the storage device 170 via the network 120. Processing device 110 may directly connect the storage device 170 to access information and/or data. For example, processing device 110 may acquire output data of natural gas and/or loss data of natural gas from storage device 170.

Processing device 110 may process the acquired data and/or information. For example, processing device 110 may determine whether a natural gas transmission is abnormal based on output data of natural gas and loss data of natural gas acquired by metering equipment 140. In some embodiments, processing device 110 may be a single server or server group. The processing device 110 may be local or remote. Processing device 110 may be implemented on a cloud platform.

Network 120 may include any suitable network that provides information and/or data exchange capable of promoting application scenario 100. In some embodiments, information and/or data may be exchanged between one or more components of the application scenario 100 (e.g., a processing device 110, a transmission pipe network pipe, the metering equipment 140, transmission station 150, consumption area 160, and storage device 170) through network 120.

In some embodiments, network 120 may be any one or more of a wired network or wireless network. In some embodiments, network 120 may include one or more network access points. For example, network 120 may include wired or wireless network access points, such as base stations and/or network switching points 120-1, 120-2, . . . , through which one or more components of scenario 100 may connect to network 120 to exchange data and/or information.

The transmission pipe network 130 may be configured to deliver natural gas from transmission station 150 to the consumption area 160. In some embodiments, the transmission pipe network pipe is provided with a plurality of distribution pipes for connecting with a plurality of transmission stations 150 and a plurality of consumption areas 160. In some embodiments, a plurality of consumption areas 160 may be provided with a plurality of casing networks according to the size of gas consumption and air pressure. In some embodiments, the transmission pipe network 130 is provided with metering equipment 140 for measuring the amount of natural gas transmission.

Metering equipment 140 may be configured to measure the amount of air supply in the transmission pipe network 130. In some embodiments, the metering equipment 140 may be disposed on the gas supply node of the transmission pipe network, and collect the output data of natural gas of the air supply node. In some embodiments, metering equipment 140 may be disposed on the air supply terminal or air supply node of the transmission pipe network, and collect loss data of natural gas of the air supply terminal or air supply node.

In some embodiments, metering equipment 140 may transmit acquired output data of natural gas and/or loss data of natural gas to processing device 110 and/or natural gas transmission station 150 through network 120. In some embodiments, metering equipment 140 may include one or more different metering apparatus with different metering methods. For example, metering equipment 140 may include a natural gas volume metering equipment 140-1, a natural gas energy metering equipment 140-2, a natural gas mass metering equipment (not shown), and the like.

Natural gas volume metering equipment 140-1 may measure data of natural gas transmission volume during a time period and corresponding natural gas pressure, temperature and other data. In some embodiments, the natural gas volume metering equipment 140-1 may be a well plate flowmeter, a turbine flowmeter, an ultrasonic flowmeter, a waist wheel flowmeter, a vortex flowmeter, a rotary vortex flowmeter, and the like. Metering of natural gas energy may be performed by multiplying volume metering and/or mass metering with a calorific value of natural gas per unit flow. In some embodiments, the calorific value of natural gas may be measured by direct combustion method, or by analyzing gas components. In some embodiments, the metering equipment of natural gas energy 140-2 is provided with an online and/or offline gas chromatograph for measuring the calorific value of natural gas.

The transmission station 150 may be configured to transmit the natural gas in the trunk pipe network of natural gas or natural gas storage to the gas consumption area 160 through the transmission pipe network 130. In some embodiments, the transmission station 150 may be provided with a natural gas data monitoring device, which may be configured to monitor the performance parameters of the natural gas of the transmission station, such as pressure, temperature, flow, component, and the like. In some embodiments, the transmission station 150 may regulate the transmission parameters such as the transmission pressure and the transmission flow of natural gas and the like.

In some embodiments, the transmission station 150 may be provided with metering equipment for metering output data of natural gas. In some embodiments, the transmission station 150 may transmit the outbound output data of natural gas to the processing device 110 through the network 120. In some embodiments, the transmission station 150 may receive the gas transmission information of natural gas emitted by the processing device 110 and/or the metering equipment 140. In some embodiments, the transmission station 150 may obtain the result of whether the natural gas transmission is abnormal from the processing device 110. In some embodiments, the transmission station 150 may adjust natural gas transmission parameters in response to the result of abnormal natural gas transmission, such as reducing the transmission pressure and/or flow of natural gas, closing the valve to stop transmission, etc.

The consumption area 160 refers to a terminal area consuming natural gas. In some embodiments, the consumption area 160 may include an area of urban residential gas consumption, an area of a natural gas filling station, an area of urban central heating, an area of natural gas power generation, an area of industrial gas consumption, etc.

In some embodiments, the risk prevention system based on the energy of natural gas in a full cycle may include a loss data acquisition module, an output data acquisition module, and a data processing module.

The loss data acquisition module is configured to acquire loss data of natural gas based on the metering equipment. In some embodiments, the loss data of the natural gas includes metering data of the natural gas consumed in a measured area during a plurality of time periods;

The output data acquisition module is configured to acquire output data of natural gas. In some embodiments, the output data of natural gas includes metering data of the natural gas transmitted by a gas supplier in the measured area during the plurality of time periods;

The data processing module is configured to determine whether natural gas transmission abnormality occurs by processing the loss data of the natural gas and the output data of the natural gas. In some embodiments, the data processing module may also be configured to determine whether the difference between the output data of natural gas and the loss data of natural gas is less than the preset threshold; if the difference between the output data of the natural gas and the loss data of the natural gas is less than the preset threshold, determining that the natural gas transmission abnormality has not occurred; if the difference between the output data of the natural gas and the loss data of the natural gas is not less than the preset threshold, determining that natural gas transmission abnormality has occurred.

In some embodiments, the data processing module is configured to calculate an energy difference between the output data of the natural gas and the loss data of the natural gas and judge whether the energy difference is less than the first threshold, if the energy difference is less than the first threshold, calculate a volume difference between the output data of natural gas and the loss data of natural gas if the energy difference is not less than a first threshold, determine that the natural gas transmission abnormality has occurred; judge whether the volume difference is less than the second threshold, if the volume difference is less than a second threshold, determine that natural gas transmission abnormality has not occurred, if the volume difference is not less than the second threshold, determine that natural gas transmission abnormality has occurred.

In some embodiments, the data processing module is further configured to determine a gas leakage risk degree during a time period of the plurality of time periods by processing first use data of the natural gas during the time period using a first model.

In some embodiments, the risk prevention system based on full cycle energy of natural gas further includes an abnormal position determining module.

The abnormal position determination module is configured to determine a location of the abnormality (also referred to as abnormal location) in response to the occurrence of natural gas transmission abnormality. In some embodiments, the abnormal position determining module is further configured to obtain measured data of various transmission equipment of natural gas; determine the location of the abnormality by processing the detection data using a third model.

It should be understood that the system and modules shown in FIG. 1 may be implemented in various ways. For example, in some embodiments, the application scenario may also include a database. However, these changes and modifications do not depart from the scope of present disclosure.

Figure 2:
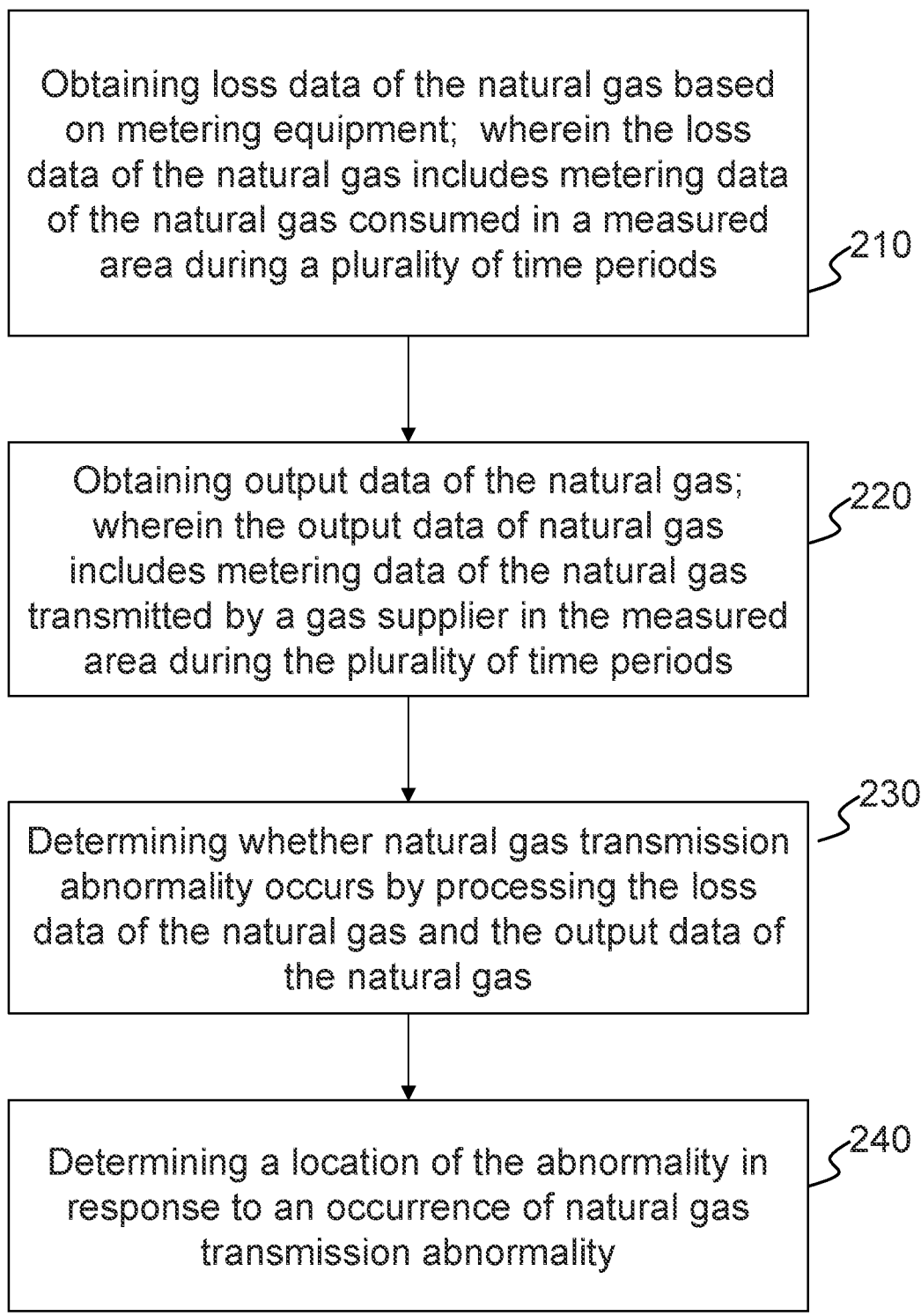
FIG. 2 is an exemplary flow chart of a risk prevention method based on the energy of natural gas in a full cycle according to some embodiments of present disclosure.

FIG. 2 is an exemplary flow diagram of a risk prevention method based on the energy of natural gas in a full cycle according to some embodiments of present disclosure. As shown in FIG. 2, process 200 includes the following steps. In some embodiments, the process 200 may be executed by the processing device 110.

Step 210, loss data of natural gas may be obtained based on the metering equipment. In some embodiments, step 210 may be executed by the loss data acquisition module.

Loss data of natural gas refers to the measurement data of natural gas consumed in the measured area during multiple time periods. In some embodiments, loss data of natural gas may include volume consumption of natural gas, energy consumption of natural gas.

The measured area refers to the terminal area (i.e. consumption area) where natural gas consumption needs to be counted. In some embodiments, the measured area may include an area for urban residents to use gas, an area for natural gas filling stations, an area for urban central heating, an area for natural gas power generation, a factory, etc. In some embodiments, a large measured area may be divided into a plurality of small measured areas. For example, the area for urban residents to use gas may be divided into community gas consumption area, community gas consumption area, unit building gas consumption area and household gas consumption area.

Multiple time periods refer to multiple data collection time periods divided according to settings. In some embodiments, the period may be divided into the quarter, month, day, hour, minute. The interval between time periods in different gas consumption areas may be different.

In some embodiments, the time interval between multiple time periods may be determined in a variety of ways. For example, it may be preset to take the same interval value, and it may also be set to different interval values according to the actual situation. For more description of determining the time interval, see more description of FIG. 4 and FIG. 5.

Metering data refers to the statistical data of natural gas measured by metering equipment. In some embodiments, the metering data is determined based on information such as temperature, pressure, composition, content, flow rate, compression factor, density and calorific value of natural gas. In some embodiments, the metering data of natural gas may be obtained by metering skid, and more explanation of the metering skid may see FIG. 8 and related content. In some embodiments, the metering data may include volume metering data of natural gas and metering data of natural gas energy.

In some embodiments, the loss data of natural gas may be obtained by summing the loss data of the measured area. In some embodiments, the loss data of natural gas in the measured area may be obtained by summing the loss data measured by the metering equipment of all the smallest gas consuming units in the measured area. For example, the loss data of natural gas of a community may be obtained based on the sum of the loss measured by the metering equipment of all families in the community.

In some embodiments, the loss data of natural gas may also be obtained based on the historical data of the gas consumption area. For example, the loss data of natural gas (also referred to as loss data of natural gas) in the same period in history may be obtained as the loss data of current natural gas.

Step 220, output data of natural gas may be obtained. In some embodiments, step 220 may be executed by the output data acquisition module.

The output data of natural gas (also referred to as output data of natural gas) refers to the metering data of the natural gas transmitted by the gas supplier for the measured area during the plurality of time periods. In some embodiments, the output data of natural gas may include the volume output of natural gas, the energy output of natural gas.

The gas supplier refers to the gas supply node that inputs natural gas into the pipe network to supply gas to the measured area. The gas supplier may also be called the gas supply area. In some embodiments, the gas supplier may be a trunk node of natural gas, storage of natural gas or a gas storage station, a boost station of natural gas, and the like supplying natural gas nodes. In some embodiments, the gas supplier may be a superior node of the gas consumption area. For example, the gas supplier of an urban community may be the gas supply node of the community or the loss node of the community gas area.

In some embodiments, the output data of natural gas may be obtained by summing the metering data of the gas supply area. For example, the output data of natural gas is obtained by the gas supplier through unified metering based on metering equipment.

In some embodiments, the output data of natural gas may also be obtained based on the historical data of the gas supplier. For example, the output data of current natural gas is the output data of natural gas of the same period in history.

Step 230, whether natural gas transmission abnormality occurs may be determined by processing the loss data of the natural gas and the output data of the natural gas. In some embodiments, step 230 may be executed by the data processing module.

Processing loss data of natural gas and output data of loss data refers to comparing them to confirm whether they are consistent or to confirm the difference value. There are many ways of processing, for example, directly calculating the difference between them, or giving them a weight coefficient first, and then calculating the difference between the two values multiplied by the weight coefficient, etc.

The transmission abnormality refers to the situation that there is a large difference between the output data and loss data of natural gas. For example, transmission abnormality may occur when the natural gas leaks, resulting in the output data of natural gas far exceeding the loss data of natural gas. In some embodiments, it may be set that the difference between the output data and loss data of natural gas exceeds a certain threshold, that is, when the difference between the output energy or output volume of natural gas and the loss energy or loss volume of natural gas exceeds the threshold, it is determined that natural gas transmission abnormality occurs, for example. Further description of the transmission abnormality refers to FIG. 3 and its description.

In some embodiments, if it is determined that a natural gas transmission abnormality occurs, the abnormality may be further responded to. For example, the operation of the following step 240 may be taken. It should be noted that step 240 may choose whether to execute or not according to the situation.

Step 240, a location of the abnormality may be determined in response to an occurrence of natural gas transmission abnormality. In some embodiments, step 240 may be executed by an abnormal position determination module.

The location of the abnormality occurs refers to the point of gas transmission of abnormalities in the natural gas transmission network, that is, the abnormal position may be a natural gas leakage point. For example, the abnormal position may be a network transfer point, etc.

Figure 6:
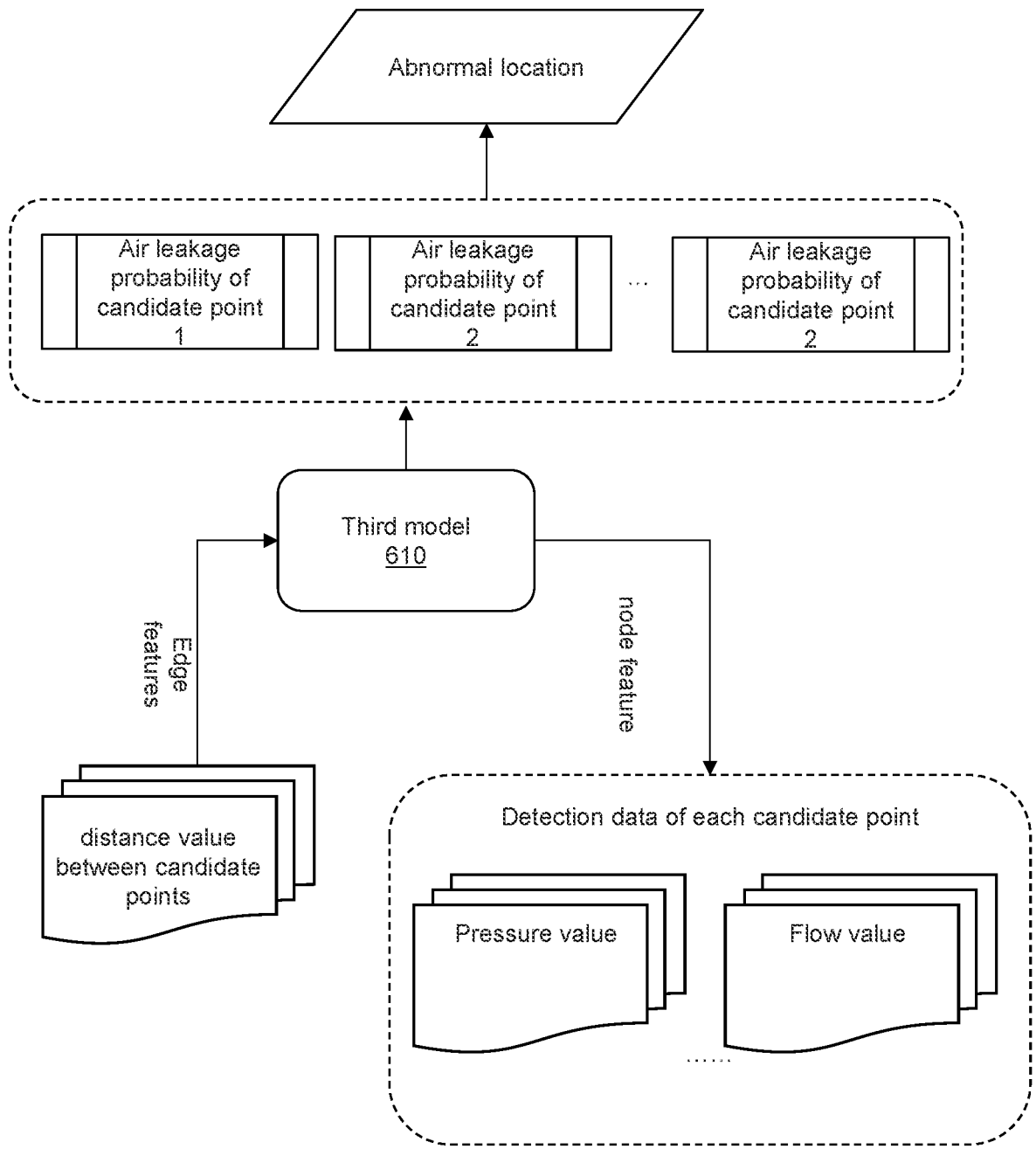
FIG. 6 is a schematic diagram of determining the location of the abnormality according to some embodiments of present disclosure.

The abnormal position determination module may determine an abnormal position in a variety of ways. For example, the abnormal position determination module may acquire historical data to set the position of the transition in the recorded area to an abnormal position. For another example, the processing device may set the pipe used for a long time in the measured area as the abnormal position. The processing device may also determine an abnormal position according to other methods, such as model implementations. Refer to FIG. 6 for details.

The present disclosure implements acquisition and processing of the output data and loss data of natural gas, can determine if natural gas transmission is abnormal, and discover the natural gas leakage risk and avoid energy waste in time, and can also determine the abnormal position in order to avoid and dispose of the risk.

In some embodiments, the transmission condition of natural gas may be determined by judging whether the difference between output data of natural gas and loss data of natural gas meets the preset requirements (e.g., less than the preset threshold). The preset threshold may be set according to the natural gas transmission condition. For example, the preset threshold may be set to the maximum value of a reasonable range of gas leakage in normal transmission. In response to meeting the preset requirements, it is determined that there is no natural gas transmission abnormality. Otherwise, it is determined that the natural gas transmission is abnormal.

In some embodiments, metering data of natural gas may include energy data of natural gas and/or volume data of natural gas, and units of metrological data may include energy units and/or volume units.

The energy data of natural gas may be data related to energy that may be generated or provided by natural gas, such as heat released during natural gas combustion (i.e., gas calorific value), and the like. The energy unit may be kilocalorie/standard cubic meter (kcal/Nm3), mega calorie/standard cubic meter (MCAL/Nm3), megajoule/standard cubic meter (MJ/Nm3), etc.

In some embodiments, the energy data of natural gas may be related to the type of gas source, gas composition, or stability of the calorific value of the gas source. For example, the energy released by the combustion of different components of natural gas with the same standard cubic meter transmitted from different natural gas stations may be different. For example, the calorific value of natural gas in station A is 36.44 MJ/Nm3 and that of natural gas in station B is 37.62 MJ/Nm3.

Natural gas volume refers to the gas volume of natural gas at 0° C. and 1 standard atmospheric pressure. The volume unit may be standard cubic meter (Nm3).

In some embodiments, the natural gas volume may be obtained based on a corresponding metering device, such as a metering instrument. The metering instrument of natural gas volume may include an orifice flowmeter, turbine flowmeter, ultrasonic flowmeter, waist wheel flowmeter, and so on.

In some embodiments, it is possible to determine whether a natural gas transmission abnormality occurs by determining whether the energy difference and/or volume difference between the output data of natural gas and the loss data of natural gas meet or are less than a preset threshold.

The natural gas supplier may leak to a certain extent when the output natural gas is transmitted to the user through the pipe. When the leaked natural gas is within the normal range, the natural gas transmission may be considered normal. When the leaked natural gas exceeds the normal range, the natural gas transmission may be considered abnormal.

In some embodiments, the amount of natural gas may be judged by a variety of indicators, for example, energy, volume, quality, etc. of natural gas. Based on different metrics, the corresponding preset threshold may be set. The specific content of judging whether there is an abnormal transmission of natural gas based on different preset thresholds may be described in detail with reference to FIG. 3-FIG. 4.

Figure 3:
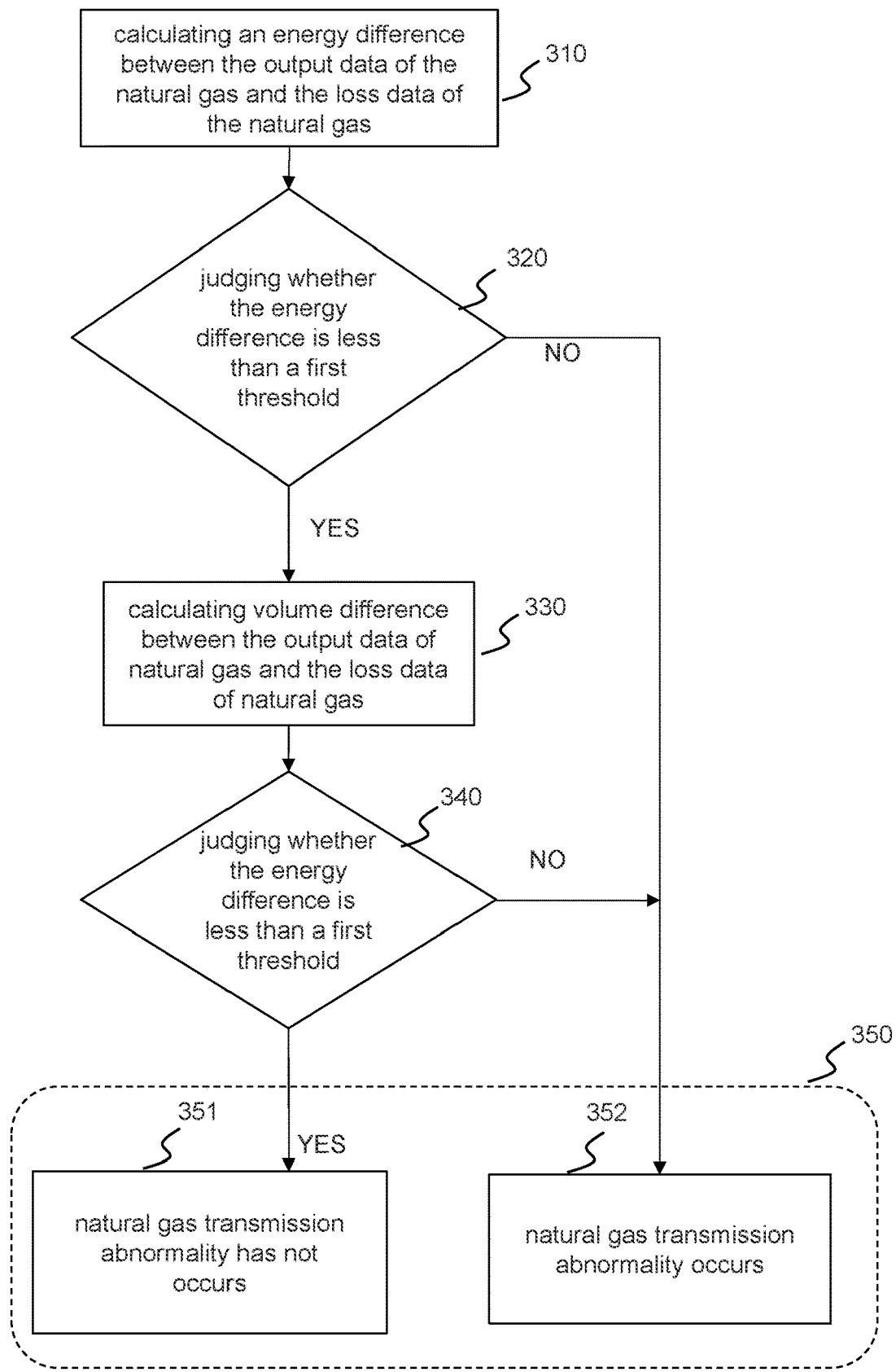
FIG. 3 is an exemplary flow diagram of judging natural gas transmission abnormality according to some embodiments of present disclosure.

FIG. 3 is an exemplary flow diagram of the determination of abnormal natural gas transmission as shown in some embodiments of the present disclosure. In some embodiments, step 310-step 350 may be executed by the data processing module.

Step 310, an energy difference between the output data of the natural gas and the loss data of the natural gas may be calculated.

In some embodiments, the energy difference between output data of natural gas and loss data of natural gas may be a difference between the natural gas energy consumed by the user in a certain area and the natural gas energy output by the natural gas supplier.

In some embodiments, output data of natural gas may be represented by E1, and loss data of natural gas may be represented by E2, E1-E2 represents the energy difference between output data of natural gas and loss data of natural gas.

For example, E1=37.62 MJ/Nm3, E2=36.44 MJ/Nm3, E1-E2=1.18 MJ/Nm3.

Step 320, whether the energy difference is less than the first threshold may be judged.

The first threshold refers to the normal range of natural gas energy leaks during the process of transmitting natural gas output from the natural gas supply to a certain area. In some embodiments, the first threshold may be set flexibly according to the different areas of the transmission, the difference between the pipe layout, the metering equipment, and the like. For example, based on the long distance of the target cell to be transmitted, complex pipe layout, aging equipment, etc., the first threshold may be set higher.

In some embodiments, the energy difference may be compared with the first threshold to determine the leakage of natural gas.

In some embodiments, in response to the energy difference is not less than the first threshold, the determination step 350 is performed, and the determination result 352 of the occurrence of natural gas transmission abnormality is obtained.

In some embodiments, step 330 is performed in response to the energy difference from the first threshold.

Step 330, volume difference between the output data of natural gas and the loss data of natural gas may be calculated.

In some embodiments, the volume difference between the output data of natural gas and the loss data of natural gas may be a difference between the natural gas volume consumed by the user in a certain area and the natural gas volume output by the natural gas supplier.

In some embodiments, output data of natural gas may be represented by V1, and loss data of natural gas is represented by V2, and V1-V2 represents the volume difference value between output data of natural gas and loss data of natural gas.

For example, V1=60 nm3, V2=58 Nm3, V1-V2=2 Nm3.

Step 340, whether the volume difference is less than a second threshold may be judged.

The second threshold refers to the normal range of natural gas volume leakage during the transmission of natural gas exported by the natural gas supplier to a certain area. In some embodiments, the setting of the second threshold can be flexibly adjusted according to different transmission areas, pipeline layout, metering equipment, etc. For example, based on the long distance of the target cell to be transmitted, complex pipe layout, aging equipment, etc., the value of the second threshold may be set higher.

In some embodiments, the volume difference value may be compared to the second threshold to judge the leakage of natural gas.

In some embodiments, in response to the volume difference is not less than the second threshold, the determination step 350 is performed, the judgment result of abnormal natural gas transmission 352 is obtained.

In some embodiments, in response to the volume difference being less than the second threshold, the determination step 350 is performed, the judgment result of abnormal natural gas transmission 352 is obtained.

In step 350, determining whether natural gas transmission abnormality occurs based on the above judgment results.

In some embodiments, as described in the previous steps, in step 350, whether a natural gas transmission abnormality occurs may be determined based on the different judgment results in step 320 and step 340. If the energy difference is not less than the first threshold or the volume difference is not less than the second threshold, the natural gas transmission abnormality is considered to have occurred. If the energy difference is less than the first threshold and the volume difference is less than the second threshold, the natural gas transmission abnormality is considered not to have occurred.

In some embodiments, the occurrence of abnormal natural gas transmission indicates that abnormal leakage occurs at one or more points during the transmission of natural gas, resulting in the leakage of natural gas exceeding the normal standard. In some embodiments, in response to the abnormality of natural gas transmission, an alert reminder may be issued to the relevant person in charge and a fault check of the corresponding point.

In some embodiments, the management system may be an energy metering management system. The energy metering management system may send fault data (such as natural gas transmission abnormalities) to the management system of the network company through the service information server. The management system of the network company may perform pipe network maintenance according to the fault data.

In some embodiments, in response to no natural gas transmission abnormality, the management system may first store the natural gas related data in the storage device for backup, and may also display the prompt of normal natural gas transmission.

The leakage of natural gas during transmission may be jointly determined by the leakage of various parts. Therefore, to judge whether the natural gas transmission is abnormal, it is necessary to comprehensively consider various situations, such as the error influence of metering equipment, the influence of transmission pipe, etc. Through the method in present disclosure. Through the above embodiments, the transmission data of natural gas may be accurately judged to reduce the impact of errors caused by different influencing factors.

It should be noted that the description of the above-mentioned natural gas transmission abnormal judgment flow is merely for example and description, without limiting the scope of application of present disclosure. Various modifications and changes may be performed under the guidance of present disclosure. However, these corrections and changes are still within the scope of present disclosure. For example, whether the natural gas transmission is abnormal may also be determined according to the judgment result of whether the energy difference is less than the first threshold.

Figure 4:
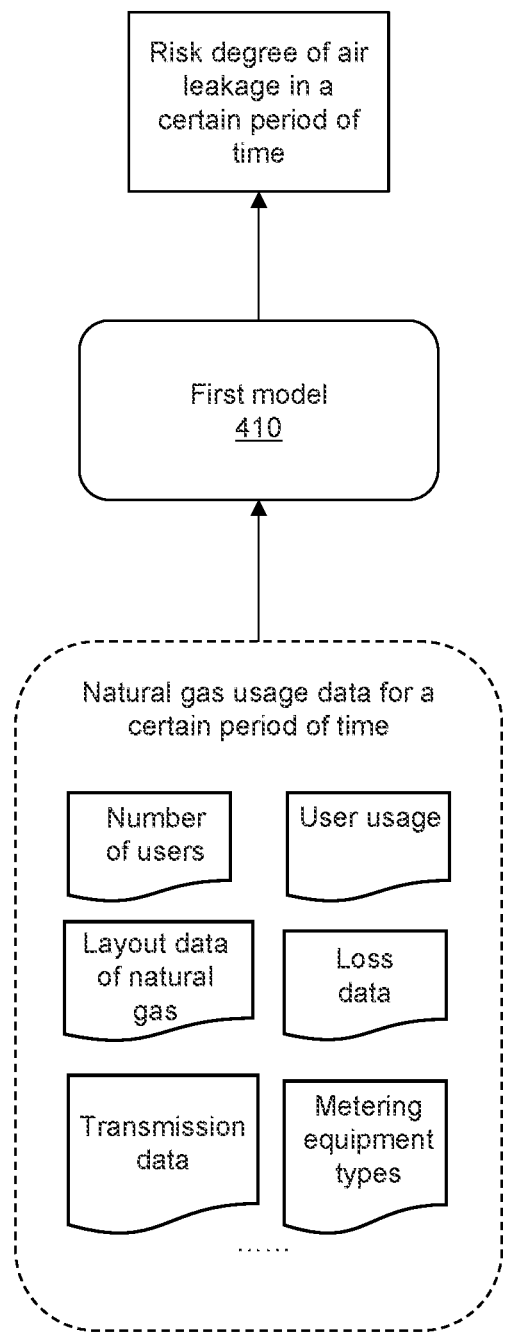
FIG. 4 is a schematic diagram of the transmission abnormality determination of natural gas according to some embodiments of present disclosure.

FIG. 4 is a schematic diagram of the natural gas transmission abnormality determination according to some embodiments of present disclosure.

Use data of natural gas refers to the data related to the use of natural gas by users within a certain period of time. For example, natural gas usage data may include at least one of the number of users, user usage, layout data of natural gas, loss data, transmission data, and metering equipment types.

The number of users can refer to the total number of natural gas users in the monitored area, such as the total number of natural gas users in a community, the total number of natural gas users in a street, etc.

User usage may be divided into corresponding contents based on different user usage scenarios, such as residential gas, industrial gas, hot boiler heating gas, etc. Residential gas may also be divided into water boiler heating gas, stove gas, etc. In some embodiments, user usage may be obtained based on the service platform of the natural gas metering network system. For further description of the service platform, see the description of FIGS. 7-10.

In some embodiments, the cause of gas leakage may be different based on the different use scenarios of the user. For example, the possible causes of gas leakage in residential gas include the leakage caused by the failure to turn off the stove switch in time. In the process of using the stove, because people stay away for a long time, resulting in the overflow of boiling soup or the flameout of the stove caused by wind, resulting in gas leakage. The clip at the rubber hose connection is not fixed firmly or the rubber hose is aged and cracked, resulting in leakage.

Natural gas layout data refers to the layout data of pipe network, for example, it may include the number of pipes, pipe length, pipe type, etc. In some embodiments, natural gas layout data may be obtained based on the service platform of the natural gas metering Internet of things system. The metering equipment type refers to the type of device configured to statistics of metering data. In some embodiments, the metering equipment type may include a membrane gas meter, a gas waist wheel (roots) gas meter, a gas turbine meter, etc.

The leakage risk refers to the possibility of abnormal leaks in a certain period of time. In some embodiments, the size of the gas leakage risk may be indicated by a probability value. For example, the risk of gas leakage is represented by a certain value in 0-1. The closer the value is to 1, the higher the risk of gas leakage is.

In some embodiments, a gas leakage risk degree may be determined during a time period of the plurality of time periods by processing first use data of the natural gas during the time period using a first model.

In some embodiments, the type of the first model may be varied. For example, the type of the first model may be a CNN model, a DNN model, and the like. Another example, the first model may also be a depth learning model such as recurrent neural network (RNN) and deep belief network (DBN).

In some embodiments, the input of the first model includes the characteristics determined by the natural gas data used in a time period of a plurality of time periods, and the input characteristics may be the corresponding data characteristics of the number of users in the natural gas data, user usage mode, natural gas layout data, and metering installation type.

In some embodiments, the input feature may include a variety of forms such as vector, matrix, sequence, and the like. For example, the metering equipment type may be represented by a vector. As an example, if there are three types of metering equipment, such as membrane gas meter, gas waist wheel (roots) gas meter and gas turbine gas meter, when 5 membrane gas meters, 0 gas waist wheel (roots) gas meters and 2 gas turbine gas meters are selected in the measured area, the vector representation of the metering equipment type may be [5,0,2]. The number 5 indicates that membrane gas meters are used in the measured area, and the number is 5. The number 0 indicates that the gas waist wheel (roots) gas meter is not used in the measured area. The number 2 indicates that gas turbine gas meters are used in the measured area, and the number is 2.

In some embodiments, the output of the first mock exam is a leakage risk of a time period.

In the first model, the first model may be trained based on multiple sets of training data. Each set of training data includes at least one data feature in the natural gas use data, and the label of each set of training data represents the gas leakage risk under the natural gas use condition.

In some embodiments, the first model is configured to construct the loss function based on the labels and initial first model, and the parameters of the first model are iteratively updated based on the loss function. The first training model is completed when the loss function of the first model satisfies the preset conditions. Among them, the preset conditions may be the convergence of the loss function, the number of iterations reaching the threshold, etc.

Through the above embodiments, the gas leakage in each time period may be determined according to the gas consumption data of natural gas in each time period, so as to find the abnormal condition of natural gas transmission more accurately and timely.

In some embodiments, the interval between the plurality of time periods may be determined based on the risk of gas leakage for at least part of the plurality of time periods.

The time interval may reflect the frequency of judging the risk of gas leakage by collecting the metering data of natural gas (such as loss data of natural gas and output data of natural gas). In some embodiments, the interval between a certain time period and the next acquisition time period may be determined according to the level of gas leakage risk in a certain time period. For example, when the risk of gas leakage in a certain period of time is high, the time interval between the next collection of natural gas measurement data for judging the risk of gas leakage and the current period of time may be shortened.

In some embodiments, the risk level may be defined based on the value of gas leakage risk degree, and the time interval may be determined based on the risk level. For example, when the risk of gas leakage is 0-0.4, it is low risk, and the corresponding time interval may be 2 hours; When the risk of gas leakage is 0.4-0.7, it is medium risk, and the corresponding time interval may be 1 hour; When the risk of gas leakage is 0.8-1, it is a high risk, and the corresponding time interval may be 0.5 hours.

In some embodiments, the time interval between a plurality of time periods may also be determined in other ways. See FIG. 5 and its detailed description for details.

Through some of the above embodiments, the time interval of data acquisition may be flexibly adjusted based on the level of gas leakage risk. When the risk of gas leakage is high, the acquisition frequency may be improved by shortening the time interval, which is conducive to the timely discovery of abnormal conditions of natural gas transmission.

Figure 5:
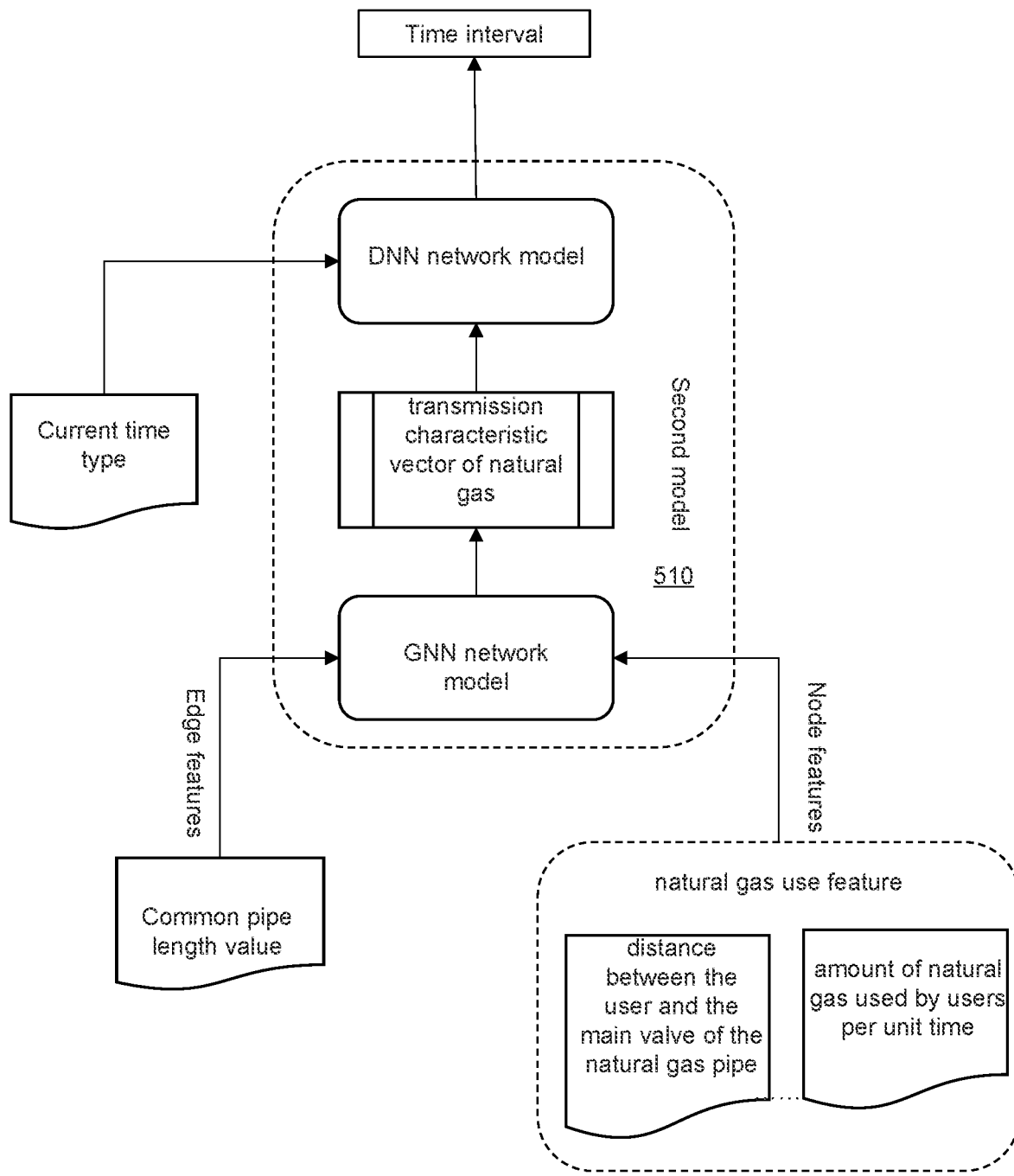
FIG. 5 is a schematic diagram of time intervals of a plurality of time periods shown in some embodiments of present disclosure.

FIG. 5 is a schematic diagram of time intervals of a plurality of vector shown in some embodiments of present disclosure.

In some embodiments, the intervals between multiple time intervals may be determined based on the time type of the current time and the usage characteristics of the natural gas in the measured area based on the second model.

The time type of the current time refers to the attribute category of the current time, which may be determined based on different classifications of time. For example, the time type may be divided into day or night, or for example, the time type may be divided into gas peak and gas low peak. In some embodiments, the time type may be represented by numbers, for example, 1 for day and 2 for night.

The use characteristics of natural gas refer to the data characteristics related to the use of natural gas by users. In some embodiments, the use characteristics of natural gas may include data characteristics such as the amount of natural gas used by the user per unit time, the distance between the user and the main valve of the natural gas pipe, and the length value of the public pipe.

In some embodiments, the amount of natural gas used by the user per unit time may be the volume value and/or energy value of natural gas used in a certain period of time. For example, the amount of natural gas used by users per unit time may be 2 m3/day. In some embodiments, the distance between the user and the main valve of the natural gas pipe refers to the length of the pipe between the user's natural gas inlet valve and the main valve of the gas supplier. For example, the distance between the user and the main valve of the natural gas pipe may be 10 km. In some embodiments, the length value of the public pipe refers to the length from the main valve to the laying of the natural gas pipe before entering the house, which may also be said to be the total length of the transmission pipe of natural gas. For example, the length value of the public pipe can be 7 km, that is, the length of the pipeline from the main gas valve to entering the community.

The second model is configured to determine the intervals between multiple time intervals. In some embodiments, the second model may be machine learning model. Machine learning models may include but are not limited to one or more combinations of neural network model (DNN), Graph Neural Networks (GNN), support vector machine model, k nearest neighbor model, decision tree model, etc.

In some embodiments, the characteristic input of the second model may include the usage characteristics of natural gas, the time type of the current time and the length of the common pipe, etc. the output may include the time interval between the current time segment and the next time of collecting data.

In some embodiments, the second model may be combined by a graph network model (GNN) and a deep neural network model (DNN). The output of the GNN model may be configured as an input to the DNN model, and the output of the DNN model may be configured as the final output of the second model.

GNN model is configured to correlate multiple use characteristics of natural gas and public pipe length. The characteristic input of GNN network model may include the length value of public pipe and use characteristics of natural gas (such as the natural gas used by users per unit time, the distance between users and the main natural gas valve, etc.), and output is the transmission characteristic vector of natural gas for each user.

In the GNN model, each natural gas user is taken as the node of the graph, and the public pipe connected between each user is taken as the edge of the graph. The node feature is the natural gas use feature corresponding to the user, and the edge feature is the distance value of the public pipe between two connected users.

In some embodiments, whether two nodes may be connected into an edge may be determined based on the length of the public pipe for natural gas transmission between two users. For example, when the length of the natural gas public pipe transmitted by two users exceeds the threshold, the two nodes are connected; otherwise, it is not connected. For example, if the public pipe between adjacent users living in the same building is short and does not exceed the preset threshold, the corresponding nodes of two users will not be connected.

The DNN model is configured to determine the time interval. The input of DNN model is the output of GNN model and the time type of current time. The output is the time interval between the next data acquisition and the current time.

In some embodiments, GNN model and DNN model may be obtained through joint training. The second training samples of the model include the map of the transmission characteristics of the labeling natural gas and the corresponding historical time type. The nodes included in the natural gas transmission characteristics consist of the users who use the natural gas in the historical time, and the characteristics of the nodes represent the natural gas usage characteristics in the corresponding historical time. The edge is the connecting line between two connected users, and the characteristics of the edge represent the length value of the common pipe between the two connected users. Labels may be time interval values between multiple historical time periods.

In some embodiments, the acquisition method of the label may be manually marked. For example, it may be determined based on the historical natural gas maintenance results. If no abnormality is found based on the maintenance results, the data acquisition time interval before the area may be obtained as the training label based on the area where no abnormality is found. The diagram composed of the previous natural gas transmission characteristics in the area and the time type of the corresponding historical time are used as training samples. If an abnormality is found based on the maintenance results, the adjusted data acquisition time interval may be adjusted based on the maintenance results, and the adjusted time interval may be configured as the training label. At the same time, the diagram composed of the transmission characteristics of natural gas in case of abnormality before and the time type of corresponding historical time may be collected as the training samples.

In some embodiments, the graph of natural gas transmission characteristics (including natural gas transmission characteristics and utility pipe length values) is input into the GNN model of the second model. The time type of the current time is input into the DNN model of the second model, and the loss function is constructed based on the input and label of the GNN model. The parameters of GNN model and DNN model are updated iteratively based on the loss function until the preset conditions are met and the training is completed. After training, the parameters of the GNN model in the second model may also be determined.

Through the above embodiments, the machine learning model may be configured to accurately judge the acquisition frequency of collecting the risk of natural gas leakage, so as to improve the efficiency of detecting natural gas leakage.

In some embodiments, the location of the abnormality may be determined in response to the occurrence of a natural gas transmission abnormality. FIG. 6 is a schematic diagram of determining the location of the abnormality according to some embodiments of present disclosure.

Candidate points refer to the points that need special attention in the natural gas transmission pipe. In some embodiments, the candidate points may be determined based on the distance of the pipe, for example, one candidate point is set every 100 meters starting from the main pipe valve. The positions with high gas leakage rates can also be predicted manually, such as the connection between pipe, valves, etc.

In some embodiments, the metering equipment may be mounted on the corresponding candidate point of the transmission equipment to measure the natural gas transmission data of the candidate point.

The transmission equipment is a pipe or device such as gas transmission, such as a gas transmission line. The metering equipment refers to an instrument that measures the relevant data of natural gas during natural gas transmission. For example, pressure sensors, flow sensors, and the like.

The measured data is based on the relevant data about natural gas transmission obtained by the measuring device. For example, the pressure value detected by the pressure sensor, or the flow value detected by the flow sensor, etc. The measured data of the candidate point refers to the measured data collected by the measuring device installed based on the candidate point.

In some embodiments, the probability of leakage of each candidate point may be determined based on the processing of the measured data of each candidate point by the third model.

The probability of gas leakage at each candidate point refers to the possibility of natural gas leakage at a candidate point during transmission.

The third model may be configured to determine the probability of leakage at each candidate point. In some embodiments, the third model may be the machine learning model. Machine learning models may include but not limited to a neural network model, graph neural network model, support vector machine model, k nearest neighbor model, decision tree model, and so on.

In some embodiments, the third model may be a graph neural network model (GNN), where nodes in each input point are graphs, and determine whether the two candidates are in the same preset area (for example, the same building, etc.) to determine whether or not the connection points are connected. For example, if two candidate points are located in the same preset area, they are connected; otherwise, they are not connected. Among them, the input node features include the measured data of the corresponding candidate points, such as pressure value, flow value, etc., and the input edge features include the distance value between two candidate points.

In some embodiments, the processing equipment may train the initial third model based on the training data of multiple sets of training data to get the third model. Each set of training data includes a graph composed of multiple candidate points, in which the node of the graph is the candidate point, the edge of the graph is the connecting line between the two candidate points, the feature of the node is the historically measured data corresponding to the candidate point, and the feature of the edge is the distance between the two candidate points. The label of each set of training data represents whether there is gas leakage at the candidate point corresponding to the measured data.

In some embodiments, the loss function may be constructed through the label and the result of the initial third model, and the parameters of the third model may be updated iteratively based on the loss function. When the loss function of the initial third model meets the presupposed condition, the model training is completed and the trained third model is obtained. Among them, the preset conditions may be the convergence of the loss function, the number of iterations reaching the threshold, etc.

In some embodiments, the location of the anomaly may be determined based on the probability of gas leakage at each candidate point. The greater the probability of gas leakage, the greater the probability of abnormal natural gas transmission at this point. For example, the point with the largest gas leakage probability value among all candidate points may be determined as the location where the natural gas transmission anomaly occurs. For example, the candidate points with the gas leakage probability value exceeding the threshold may be regarded as the location where the natural gas transmission anomaly occurs.

Through the above embodiments, the monitoring data of each natural gas transmission equipment or pipe may be processed based on the model, so as to determine the location of gas leakage, improve the maintenance efficiency of natural gas transmission and reduce the risk of accidents.

Figure 7:
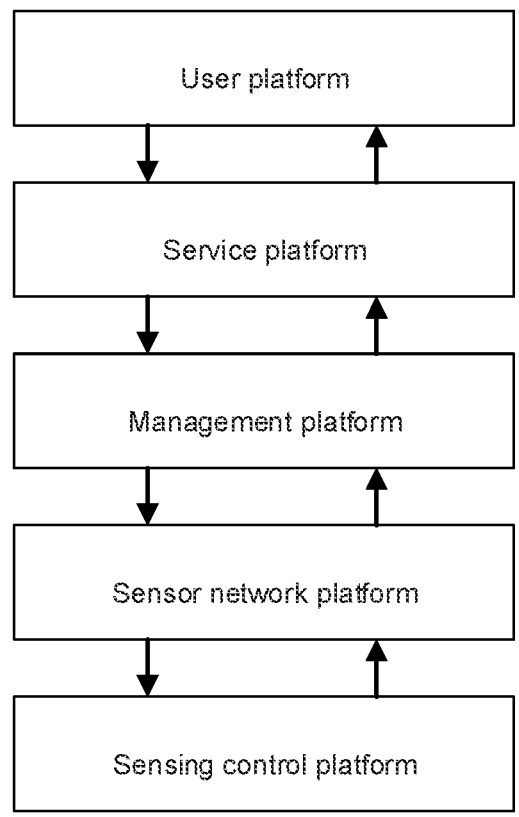
FIG. 7 is a schematic diagram of the system architecture of the natural gas metering Internet of things platform according to some embodiments of present disclosure.

FIG. 7 is a schematic diagram of the natural gas metering Internet platform system architecture shown in some embodiments of present disclosure. In some embodiments, the natural gas metering Internet of things system includes a user platform, a service platform, a management platform, a sensor network platform, and a sensing control platform. In some embodiments, the user platform is a management system of the pipe network company. In some embodiments, the service platform is a service information server. In some embodiments, the management platform is a metering management system. In some embodiments, the sensing network platform provides a network and gateway for the information interaction between the sensing control platform and the management platform. In some embodiments, the sensing control platform is a metering terminal of natural gas energy.

In some embodiments, the metering equipment of natural gas may be arranged at the gas supplier and the gas consumption area. For example, the metering equipment of natural gas may be set at the gas supply terminal or gas supply node of the pipe network company, and collect the metering data of natural gas of the gas supply terminal or gas supply node. In some embodiments, the loss data acquisition module and the output data acquisition module in the risk prevention system based on the full cycle energy of natural gas may obtain the loss data of natural gas of the gas supply terminal and the output data of natural gas of the gas supply node. In some embodiments, the metering terminal of natural gas sends the metering data of natural gas to the metering management system through the sensor network platform. In some embodiments, the data processing module in the metering management system may process the metering data of natural gas to generate the processed metering data, and the energy metering management system may send the processed metering data to the service information server.

In some embodiments, when the management system of the pipe network company requests natural gas data from the service information server, the service information server may send the processing metering data matching the request of the management system of the pipe network company to the management system of the pipe network company.

Figure 8:
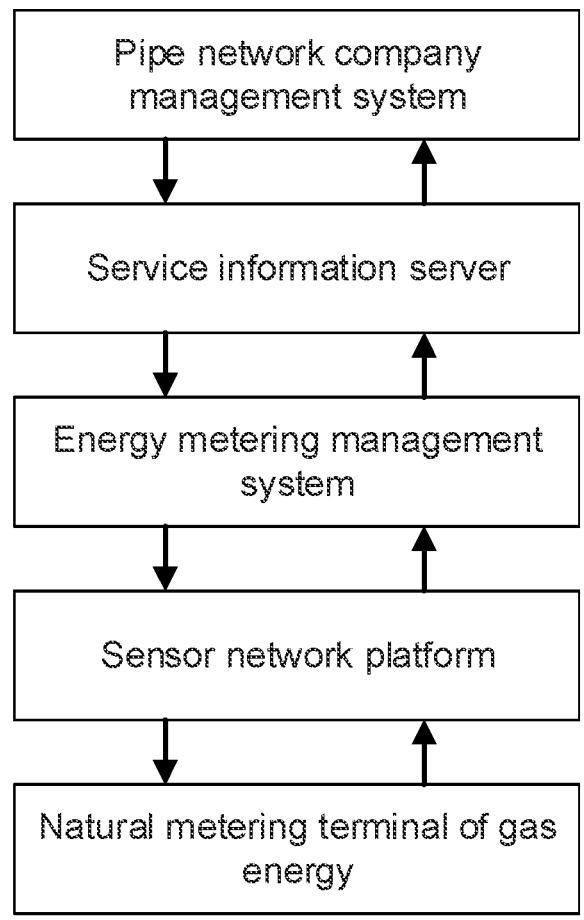
FIG. 8 is a schematic diagram of the architecture of the natural gas metering Internet of things system according to some embodiments of present disclosure.

FIG. 8 is a schematic diagram of the architecture of the natural gas metering Internet of things system according to some embodiments of present disclosure. In some embodiments, the user platform is the management system of the pipe network company, which is mainly configured to provide corresponding data for pipe network users, pipe network centers and other back ends. In some embodiments, the service platform is the service information server, which is used for the transmission of service information. The system may classify and extract the information data of each functional module of the management system through the service information server, so as to provide the necessary data information of the natural gas energy metering Internet of things system for the management system of the pipe network company. In some embodiments, the management platform is a measurement management system that provides local computing and cloud computing for the system. In some embodiments, the sensing control platform is a metering terminal of natural gas, which may be arranged on a gas consumption terminal, such as a smart gas meter, or on a gas transmission node, such as a gas consumption control mechanism in an area.

In some embodiments, the natural gas metering Internet of things system realizes the metering data of natural gas acquisition through the natural metering terminal of gas energy. In some embodiments, the energy metering terminal may collect data such as temperature, pressure, composition, content, flow, compression factor, density and calorific value. In some embodiments, the energy metering terminal may use a component sensor such as a gas chromatograph to measure the gas component and content. In some embodiments, the energy metering terminal may collect the volume flow or mass flow of gas by using gas metering instruments such as ultrasonic flowmeter, membrane gas meter, turbine flowmeter, orifice flowmeter, nozzle flowmeter, precession vortex flowmeter, volumetric flowmeter, mass flowmeter, flow totalizer, flow computer, etc. In some embodiments, the energy metering terminal may use a temperature sensor to measure the temperature of the fuel gas. In some embodiments, the energy metering terminal may measure the pressure of the fuel gas with a pressure sensor. In some embodiments, physical parameters such as compression factor, density and calorific value may be provided by the gas supplier. In some embodiments, the energy metering terminal may be a metering skid integrating various sensors for collecting various information of natural gas.

In some embodiments, the information collected by the energy metering terminal may be calculated directly at the natural metering terminal of gas energy, or sent to the energy metering management system through the sensor network platform for unified calculation by the energy metering management system.

In some embodiments, the sensor network platform may use transmission technologies and gateways such as ProfNet, 5 g and Ethernet to transmit the data packets obtained by the sensing control platform to the energy metering management system for comprehensive calculation completely, quickly, safely and effectively. In some embodiments, the sensor network layer also includes a sensor network management system, which may realize various protocol conversion and communication management. In some embodiments, the sensor network management system makes the gas metering Internet of things system compatible with sensors or metering systems from different manufacturers, sensor network management system may be configured to save costs when upgrading the old system, and may also be configured for the construction of new projects to increase the flexibility of sensor selection.

The system architecture set in this description may provide a reliable scheme for the whole natural gas energy metering system. At the same time, due to this design, the existing smart meter Internet is easy to be transformed and the applicability of the system is improved.

In some embodiments, the natural metering terminal of gas energy may obtain the chromatographic data of the natural gas sample through the chromatographic sensor, and the natural metering terminal of gas energy may obtain the volume data of the natural gas sample through the ultrasonic sensor.

In some embodiments, when the energy metering management system receives the metering data of natural gas, the energy metering management system obtains the energy data corresponding to the volume data according to the chromatographic data and volume data and takes the energy data as the first data in the processing metering data and takes the volume data as the second data in the processing metering data.

In some embodiments, the system may obtain volume data and chromatographic data through the natural metering terminal of gas energy and obtain energy data through the energy metering management system, and process the energy data and volume data separately In some embodiments, when the data to be requested is energy data, such as foreign trade, energy data may be requested, and when the data to be requested is volume data, such as individual user querying gas consumption, volume data may be requested, Through the system architecture set in this description, the compatibility of the system may be improved, and the smoothness of the transition may be well improved in the process of measurement mode change transition.

Figure 9:
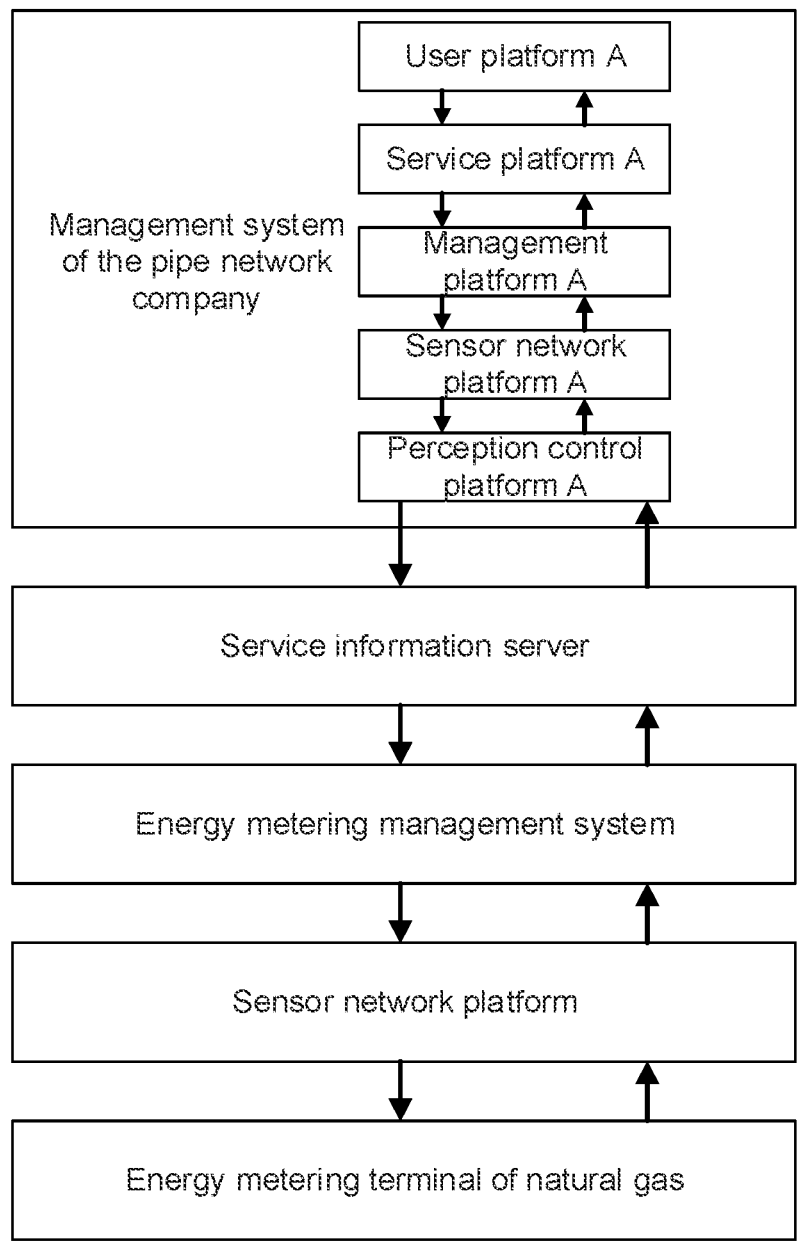
FIG. 9 is schematic diagram of another architecture of the natural gas metering Internet of things system according to some embodiments of present disclosure.

FIG. 9 is a schematic diagram of another natural gas metering Internet of Intranet system according to some embodiments of present disclosure.

In some embodiments, the management system of the pipe network company includes a user platform A, a service platform A, a management platform A, a sensor network platform A and a perception control platform A that interact in turn.

In some embodiments, the perception control platform A is a terminal that receives and processes measurement data. In some embodiments, the management platform A obtains and processes metering data through the sensor network platform A. In some embodiments, user platform A is a terminal requesting processing of metering data. In some embodiments, when the user platform A requests the service platform A to process the measurement data, the service platform A sends the request of the user platform A to the management platform A, and management platform A processes the request and sends the processed request to the sensing control platform A through the sensor network platform A. The perceptual control platform A sends the processed request to the service information server as the request of the management system of the pipe network company.

In some embodiments, the sensing network platform A in the management system of the pipe network company is a terminal that receives and processes measurement data, such as a server for data collection and distribution. In some embodiments, the management platform A is the main server of the management system of the pipe network company. In some embodiments, when the settlement object of the management system of the pipe network company is the volume measurement department, such as the gas user, the volume measurement data may be requested when the settlement object of the management system of the pipe network company is the energy measurement department, such as the international gas supply agency, the energy measurement data may be requested. In some embodiments, the management system of the pipe network company may also convert the energy measurement and volume measurement data.

In some embodiments, a first request instruction matching the first data and a second request instruction matching the second data are preset in the management platform A. In some embodiments, when the request type of user platform A matches the first request instruction, the management platform A requests the first data through the perception control platform A. In some embodiments, when the request type of the user platform A matches the second request instruction, the management platform A requests the second data through the perception control platform A.

In some embodiments, the first request instruction and the second request instruction may be directly built in the central server of the management system of the pipe network company, the first request instruction and the second request instruction corresponding to the first data and the second data respectively, and the corresponding relationship between the two may be obtained through SVM classifier learning or in-depth learning.

For example, an international gas supply agency in user platform A sends a data request. At this time, the binary classifier generated according to SVM may recognize its request as the first request instruction according to its own attributes. At this time, management platform A may request the first data through perception control platform A. Similarly, if the domestic gas supply organization sends a data request, it may also be recognized as a second request instruction. At this time, management platform A may request the second data through the perception control platform A.

Through the design method disclosed in this description, the volume measurement or capacity measurement data may be transmitted quickly in a short period of time, which is suitable for the transition of volume measurement and energy measurement transformation.

Figure 10:
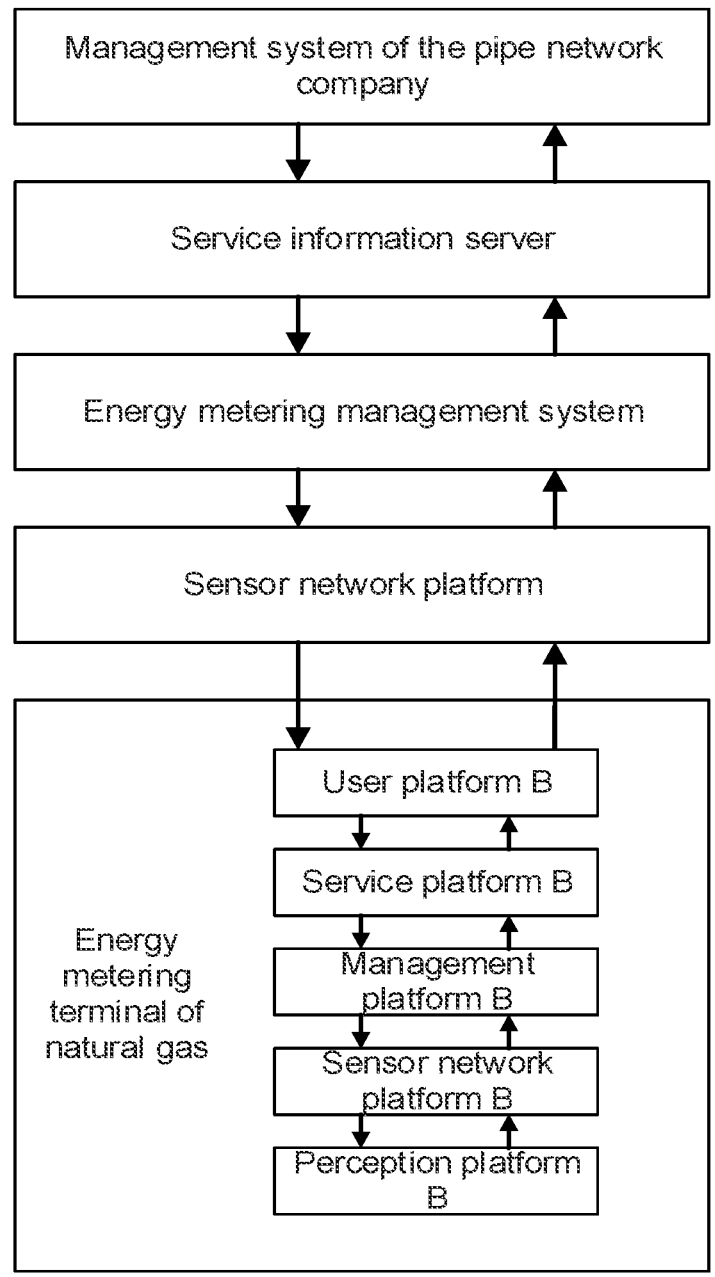
FIG. 10 is a schematic diagram of another natural gas metering Internet of things system architecture according to some embodiments of present disclosure.

FIG. 10 is a schematic diagram of another natural gas metering Internet of things system architecture according to some embodiments of present disclosure.

In some embodiments, the natural metering terminal of gas energy includes a user platform B, a service platform B, a management platform B, a sensor network platform B, and a sensing control platform B that interacts in turn.

In some embodiments, the sensing control platform B includes a chromatographic sensor for acquiring chromatographic data of natural gas samples, an ultrasonic sensor for acquiring volumetric data of natural gas samples, and a correlation sensor for acquiring relevant data of energy measurement of natural gas samples. In some embodiments, the data related to the energy measurement of natural gas samples include data such as natural gas temperature, natural gas pressure, natural gas content, natural gas flow, natural gas compression factor, natural gas density and natural gas calorific value.

In some embodiments, the sensing control platform B may send the chromatographic data, volume data and related data to the management platform B through the sensor network platform B. the management platform B obtains the first natural gas energy data according to the chromatographic data, volume data and related data, and transmits the chromatographic data, volume data. The relevant data and the first natural gas energy data are sent to the user platform B through the service platform B. The user platform B sends the chromatographic data, volume data, relevant data and the first natural gas energy data as natural gas measurement data to the energy measurement management system through the sensor network platform.

In some embodiments, the system adopts the method of energy data calculation at the natural metering terminal of gas energy.

In some embodiments, the energy metering management system obtains the second natural gas energy data based on the received chromatographic data, volume data, and related data. In some embodiments, the energy metering management system proofreads the data according to the second natural gas energy data and the first natural gas energy data and sends the abnormal data results with abnormal proofreading results to the natural metering terminal of gas energy through the sensor network platform. In some embodiments, the natural metering terminal of gas energy checks the abnormal equipment on the natural metering terminal of gas energy according to the abnormal data results.

In some embodiments, the system may correct the data by comparing the second natural gas energy data with the first natural gas energy data. In some embodiments, when the data difference is large, the system may find abnormal equipment to provide a reference for equipment operation and maintenance.

In some embodiments, the energy metering management system may obtain the abnormal data during a preset period and obtain the fault data in the area corresponding to the abnormal data according to the abnormal data during a preset period.

In some embodiments, the energy metering management system sends the fault data to the management system of the pipe network company through the service information server, and the management system of the pipe network company performs pipe network maintenance on the area matching the fault data according to the fault data. In some embodiments, the system may determine the fault area through the fault data, and then the management system of the pipe network company may carry out further fault screening and pipe network maintenance.

In some embodiments, the management platform B adopts a programmable controller integrated into the natural metering terminal of gas energy. In some embodiments, the programmable controller may adopt various controllers that may carry out the operation, such as PLC, CPLD, FPGA, etc.

The basic concepts have been described above, apparently, in detail, as will be described above, and does not constitute limitations of the specification. Although there is no clear explanation here, those skilled in the art may make various modifications, improvements, and modifications of present disclosure. This type of modification, improvement, and corrections are recommended in present disclosure, so this class is modified, improved, and the amendment remains in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not configured to define the order of the present disclosure processes and methods. Although some examples of the invention currently considered useful in the present invention are discussed in the above disclosure, it should be understood that the details of this class will only be described, and the appended claims are not limited to the disclosed embodiments. The requirements are designed to cover all modifications and equivalents combined with the substance and range of the present disclosure. For example, although the implementation of various components described above may be embodied in a hardware device, it may also be implemented as a software only solution, e.g., an installation on an existing server or mobile device.

In addition, it should be noted that in order to simplify the expression disclosure of the present disclosure, it will help the description of one or more of the invention, and the foregoing will be returned to one embodiment, and brief description of the drawings. However, the present disclosure method does not mean that the characteristics of the characteristics required for the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A method for risk prevention based on energy of natural gas in a full cycle, implemented on a computing device comprising at least one storage device and at least one processor, wherein the method is executed by the at least one processor, the method comprising:

obtaining loss data of the natural gas based on metering equipment, wherein the loss data of the natural gas includes metering data of the natural gas consumed in a measured area, wherein the metering of the consumed natural gas is performed during a plurality of time periods;

wherein an interval between the plurality of time periods is determined by processing a time type of a current time and second use data of the natural gas in the measured area using a second model; wherein the second model is a combined model of a graph neural network (GNN) model and a deep neural network (DNN) model; wherein an input of the GNN model includes a length value of public pipe and a natural gas use feature; and an output of the GNN model is a transmission feature vector of the natural gas for each natural gas user; wherein each natural gas user is taken as a node of a map, and a public pipe connected between natural gas users is taken as an edge of the map, node feature is the natural gas use feature corresponding to the natural gas user, and edge feature is the length value of the public pipe connected between two natural gas users;

the DNN model is configured to determine a time interval; an input of the DNN model is the output of the GNN model and the time type of the current time; and an output of the DNN model is the time interval between a next data acquisition time and the current time;

the GNN model and the DNN model are obtained through joint training based on training samples and labels; wherein the training samples include a map of transmission feature of the natural gas and a corresponding historical time type; nodes included in the map of transmission feature of the natural gas are users who use the natural gas in the historical time, and a node feature represents natural gas use feature in the corresponding historical time; an edge is a connecting line between two users, and an edge feature represents a length value of the public pipe connected between two users; and the labels are time interval between multiple historical time periods; and the joint training includes: inputting the map of transmission feature of the natural gas into an initial GNN model of the second model; inputting the time type of the current time and an output of the initial GNN model into an initial DNN model of the second model; constructing a loss function based on an output of the initial GNN mode and the labels; updating parameters of the initial GNN model and the initial DNN model iteratively based on the loss function until preset conditions are met; and obtaining the GNN model and the DNN model, wherein the preset conditions include a convergence of the loss function and a number of iterations reaching a threshold;

obtaining output data of the natural gas, wherein the output data of the natural gas includes metering data of the natural gas transmitted by a gas supplier in the measured area, wherein the metering of the transmitted natural gas is performed during the plurality of time periods; and determining whether natural gas transmission abnormality occurs by processing the loss data of the natural gas and the output data of the natural gas;

in response to determining that the natural gas transmission abnormality has occurred;

obtaining measured data of each transmission equipment of the natural gas; wherein the measured data include pressure value detected by a pressure sensor and flow value detected by a flow sensor; and determining location of the abnormality by processing the measured data using a third model; wherein the third model is a GNN model, wherein an input of the third model includes a graph composed of multiple candidate points, and an output of the third model is a leakage probability at each candidate point; wherein node of the graph is the candidate points, edge of the graph is a connecting line between the two candidate points, node feature is measured data corresponding to the candidate point, edge feature is a distance between the two candidate points; wherein the third model is obtained by training based on third training samples and third labels, wherein the third training samples include a sample graph composed of multiple sample candidate points, in which node of the sample graph is the sample candidate points, edge of the sample graph is a connecting line between the two sample candidate points, node feature is historically measured data corresponding to the sample candidate point, edge feature is a distance between the two sample candidate points, the third labels represent whether there is gas leakage at the sample candidate point corresponding to the historically measured data;

the training includes: inputting the third training samples into an initial third model; constructing a loss function based on the third labels and an output of the initial third model; updating parameters of the initial third model iteratively based on the loss function; and obtaining the third model when the loss function meets a preset condition, wherein the preset condition include a convergence of the loss function and a number of iterations reaching a threshold; and a candidate point with a largest gas leakage probability among all candidate points or candidate points with the gas leakage probability exceeding a threshold is determined as the location of the abnormality;

sending the location of the abnormality to a transmission station to make the transmission station adjust natural gas transmission parameters in response to a result of abnormal natural gas transmission.

2. The method of claim 1, wherein the determining whether natural gas transmission abnormality occurs by processing the loss data of the natural gas and the output data of the natural gas includes:

determining whether a difference between the output data of the natural gas and the loss data of the natural gas is less than a preset threshold; and if the difference between the output data of the natural gas and the loss data of the natural gas is less than the preset threshold, determining that the natural gas transmission abnormality has not occurred; or if the difference between the output data of the natural gas and the loss data of the natural gas is not less than the preset threshold, determining that natural gas transmission abnormality has occurred.

3. The method of claim 2, wherein a unit of the metering data includes an energy unit and/or a volume unit.

4. The method of claim 3, wherein the determining whether natural gas transmission abnormality occurs by processing the loss data of the natural gas and the output data of the natural gas includes:

calculating an energy difference between the output data of the natural gas and the loss data of the natural gas and judging whether the energy difference is less than a first threshold, if the energy difference is less than the first threshold, calculating a volume difference between the output data of the natural gas and the loss data of the natural gas, or if the energy difference is not less than a first threshold, determining that the natural gas transmission abnormality has occurred; and judging whether the volume difference is less than a second threshold, if the volume difference is less than the second threshold, determining that the natural gas transmission abnormality has not occurred, or if the volume difference is not less than the second threshold, determining that the natural gas transmission abnormality has occurred.

5. The method of claim 1, wherein the determining whether natural gas transmission abnormality occurs by processing the loss data of the natural gas and the output data of the natural gas includes:

determining a gas leakage risk degree during a time period of the plurality of time periods by processing first use data of the natural gas during the time period using a first model.

6. The method of claim 5, wherein an interval between the plurality of time periods is determined based on one or more gas leakage risk degrees of at least part of the plurality of time periods.

7. A system for risk prevention based on energy of natural gas in a full cycle, comprising:
at least one storage device including a set of instructions; and
at least one processor in communication with the at least one storage device, wherein when executing the set of instructions, the at least one processor is configured to cause the system to perform at least one operation, comprising:
obtaining loss data of the natural gas based on metering equipment, wherein the loss data of the natural gas includes metering data of the natural gas consumed in a measured area, wherein the metering of the consumed natural gas is performed during a plurality of time periods;
wherein an interval between the plurality of time periods is determined by processing a time type of a current time and second use data of the natural gas in the measured area using a second model;
the second model is a combined model of a graph neural network (GNN) model and a deep neural network (DNN) model; wherein
an input of the GNN model includes a length value of public pipe and a natural gas use feature; and an output of the GNN model is a transmission feature vector of the natural gas for each natural gas user; wherein each natural gas user is taken as a node of a map, and a public pipe connected between natural gas users is taken as an edge of the map, node feature is the natural gas use feature corresponding to the natural gas user, and edge feature is the length value of the publicpipe connected between two natural gas users;
the DNN model is configured to determine a time interval; an input of the DNN model is the output of the GNN model and the time type of the current time; and an output of the DNN model is the time interval between a next data acquisition time and the current time;
the GNN model and the DNN model are obtained through joint training based on training samples and labels; wherein the training samples include a map of transmission feature of the natural gas and a corresponding historical time type; nodes included in the map of transmission feature of the natural gas are users who use the natural gas in the historical time, and a node feature represents natural gas use feature in the corresponding historical time; an edge is a connecting line between two users, and an edge feature represents a length value of the public pipe connected between two users; and the labels are time interval between multiple historical time periods; and
the joint training includes: inputting the map of transmission feature of the natural gas into an initial GNN model of the second model; inputting the time type of the current time and an output of the initial GNN model into an initial DNN model of the second model; constructing a loss function based on an output of the initial GNN mode and the labels; updating parameters of the initial GNN model and the initial DNN model iteratively based on the loss function until preset conditions are met; and obtaining the GNN model and the DNN model, wherein the preset conditions include a convergence of the loss function and a number of iterations reaching a threshold;

obtaining output data of the natural gas, wherein the output data of the natural gas includes metering data of the natural gas transmitted by a gas supplier in the measured area, wherein the metering of the transmitted natural gas is performed during the plurality of time periods; and
determining whether natural gas transmission abnormality occurs by processing the loss data of the natural gas and the output data of the natural gas;
in response to determining that the natural gas transmission abnormality has occurred;
obtaining measured data of each transmission equipment of the natural gas; wherein the measured data include pressure value detected by a pressure sensor and flow value detected by a flow sensor; and
determining location of the abnormality by processing the measured data using a third model; wherein the third model is a GNN model, wherein an input of the third model includes a graph composed of multiple candidate points, and an output of the third model is a leakage probability at each candidate point; wherein node of the graph is the candidate points, edge of the graph is a connecting line between the two candidate points, node feature is measured data corresponding to the candidate point, edge feature is a distance between the two candidate points; wherein
the third model is obtained by training based on third training samples and third labels, wherein the third training samples include a sample graph composed of multiple sample candidate points, in which node of the sample graph is the sample candidate points, edge of the sample graph is a connecting line between the two sample candidate points, node feature is historically measured data corresponding to the sample candidate point, edge feature is a distance between the two sample candidate points, the third labels represent whether there is gas leakage at the sample candidate point corresponding to the historically measured data;
the training includes: inputting the third training samples into an initial third model; constructing a loss function based on the third labels and an output of the initial third model; updating parameters of the initial third model iteratively based on the loss function; and obtaining the third model when the loss function meets a preset condition, wherein the preset condition include a convergence of the loss function and a number of iterations reaching a threshold; and
a candidate point with a largest gas leakage probability among all candidate points or candidate points with the gas leakage probability exceeding a threshold is determined as the location of the abnormality;
sending the location of the abnormality to a transmission station to make the transmission station adjust natural gas transmission parameters in response to a result of abnormal natural gas transmission.

8. The system of claim 7, wherein to determine whether natural gas transmission abnormality occurs by processing the loss data of the natural gas and the output data of the natural gas, the at least one processor is configured to cause the system to perform at least one operation comprising:
determining whether a difference between the output data of the natural gas and the loss data of the natural gas is less than a preset threshold; and
if the difference between the output data of the natural gas and the loss data of the natural gas is less than the preset threshold, determining that the natural gas transmission abnormality has not occurred; or if the difference between the output data of the natural gas and the loss data of the natural gas being is not less than the preset threshold, determining that natural gas transmission abnormality has occurred.

9. The system of claim 8, wherein a unit of the metering data includes an energy unit and/or a volume unit.

10. The system of claim 9, wherein to determine whether natural gas transmission abnormality occurs by processing the loss data of the natural gas and the output data of the natural gas, the at least one processor is configured to cause the system to perform at least one operation including:

calculating an energy difference between the output data of the natural gas and the loss data of the natural gas and judging whether the energy difference is less than a first threshold, if the energy difference is less than the first threshold, calculating a volume difference between the output data of the natural gas and the loss data of the natural gas, or if the energy difference is not less than a first threshold, determining that the natural gas transmission abnormality has occurred; and judging whether the volume difference is less than second threshold, if the volume difference is less than a second threshold, determine that the natural gas transmission abnormality has not occurred, or if the volume difference is not less than the second threshold, determining that the natural gas transmission abnormality has occurred.

11. The system of claim 7, wherein to determine whether natural gas transmission abnormality occurs by processing the loss data of the natural gas and the output data of the natural gas, the at least one processor is configured to cause the system to perform at least one operation including:

determining a gas leakage risk degree during a time period of the plurality of time periods by processing first use data of the natural gas during the time period using a first model.

12. The system of claim 11, wherein an interval between the plurality of time periods is determined based on one or more gas leakage risk degrees of at least part of the plurality of time periods.

13. A non-transitory computer readable medium storing instructions, when executed by at least one processor, causing the at least one processor to implement a method comprising:

obtaining loss data of the natural gas based on metering equipment, wherein the loss data of the natural gas includes metering data of the natural gas consumed in a measured area, wherein the metering of the consumed natural gas is performed during a plurality of time periods;

wherein an interval between the plurality of time periods is determined by processing a time type of a current time and second use data of the natural gas in the measured area using a second model; wherein the second model is a combined model of a graph neural network (GNN) model and a deep neural network (DNN) model; wherein an input of the GNN model includes a length value of public pipe and a natural gas use feature; and an output of the GNN model is a transmission feature vector of the natural gas for each natural gas user; wherein each natural gas user is taken as a node of a map, and a public pipe connected between natural gas users is taken as an edge of the map, node feature is the natural gas use feature corresponding to the natural gas user, and edge feature is the length value of the publicpipe connected between two natural gas users;

the DNN model is configured to determine a time interval; an input of the DNN model is the output of the GNN model and the time type of the current time; and an output of the DNN model is the time interval between a next data acquisition time and the current time;

the GNN model and the DNN model are obtained through joint training based on training samples and labels; wherein the training samples include a map of transmission feature of the natural gas and a corresponding historical time type; nodes included in the map of transmission feature of the natural gas are users who use the natural gas in the historical time, and a node feature represents natural gas use feature in the corresponding historical time; an edge is a connecting line between two users, and an edge feature represents a length value of the public pipe connected between two users; and the labels are time interval between multiple historical time periods; and the joint training includes: inputting the map of transmission feature of the natural gas into an initial GNN model of the second model; inputting the time type of the current time and an output of the initial GNN model into an initial DNN model of the second model; constructing a loss function based on an output of the initial GNN mode and the labels; updating parameters of the initial GNN model and the initial DNN model iteratively based on the loss function until preset conditions are met; and obtaining the GNN model and the DNN model, wherein the preset conditions include a convergence of the loss function and a number of iterations reaching a threshold;

obtaining output data of the natural gas, wherein the output data of the natural gas includes metering data of the natural gas transmitted by a gas supplier in the measured area, wherein the metering of the transmitted natural gas is performed during the plurality of time periods; and determining whether natural gas transmission abnormality occurs by processing the loss data of the natural gas and the output data of the natural gas;

in response to determining that the natural gas transmission abnormality has occurred;

obtaining measured data of each transmission equipment of the natural gas; the measured data include pressure value detected by a pressure sensor and flow value detected by a flow sensor; and determining location of the abnormality by processing the measured data using a third model; wherein the third model is a GNN model, wherein an input of the third model includes a graph composed of multiple candidate points, and an output of the third model is a leakage probability at each candidate point; wherein node of the graph is the candidate points, edge of the graph is a connecting line between the two candidate points, node feature is measured data corresponding to the candidate point, edge feature is a distance between the two candidate points; wherein the third model is obtained by training based on third training samples and third labels, wherein the third training samples include a sample graph composed of multiple sample candidate points, in which node of the sample graph is the sample candidate points, edge of the sample graph is a connecting line between the two sample candidate points, node feature is historically measured data corresponding to the sample candidate point, edge feature is a distance between the two sample candidate points, the third labels represent whether there is gas leakage at the sample candidate point corresponding to the historically measured data;

the training includes: inputting the third training samples into an initial third model; constructing a loss function based on the third labels and an output of the initial third model; updating parameters of the initial third model iteratively based on the loss function; and obtaining the third model when the loss function meets a preset condition, wherein the preset condition include a convergence of the loss function and a number of iterations reaching a threshold; and a candidate point with a largest gas leakage probability among all candidate points or candidate points with the gas leakage probability exceeding a threshold is determined as the location of the abnormality;

sending the location of the abnormality to a transmission station to make the transmission station adjust natural gas transmission parameters in response to a result of abnormal natural gas transmission.

* * * * *